(12) United States Patent
Borghi et al.

(10) Patent No.: US 10,736,302 B2
(45) Date of Patent: Aug. 11, 2020

(54) WASHING MACHINE ADAPTED FOR CAGES AND ACCESSORIES USED IN THE FIELD OF RESEARCH ON LABORATORY ANIMALS

(71) Applicant: IWT S.R.L., Casale Litta (VA) (IT)

(72) Inventors: Matteo Borghi, Legnano (IT); Marco Pagani, Legnano (IT)

(73) Assignee: IWT S.R.L., Casale Litta (VA) (IT)

( * ) Notice: Subject to any disclaimer, the term of this patent is extended or adjusted under 35 U.S.C. 154(b) by 306 days.

(21) Appl. No.: 15/601,173

(22) Filed: May 22, 2017

(65) Prior Publication Data

US 2017/0339915 A1  Nov. 30, 2017

(30) Foreign Application Priority Data

May 24, 2016 (IT) .......................... 102016000053336

(51) Int. Cl.
*A01K 1/03* (2006.01)
*B08B 3/02* (2006.01)
(Continued)

(52) U.S. Cl.
CPC .............. *A01K 1/031* (2013.01); *A01K 1/035* (2013.01); *B05B 1/20* (2013.01); *B05B 13/0405* (2013.01);
(Continued)

(58) Field of Classification Search
CPC ........ A01K 1/031; A01K 1/035; A01K 29/00; B05B 1/20; B05B 13/0405; B08B 3/02; B08B 3/024; B08B 9/0861; B08B 3/04
See application file for complete search history.

(56) References Cited

U.S. PATENT DOCUMENTS 2,947,311 A * 8/1960 Fox ..................... A47L 15/241
                                                    134/58 D
3,020,917 A * 2/1962 Lyman ................ A47L 15/0081
                                                    134/58 D
(Continued)

FOREIGN PATENT DOCUMENTS

| DE | 10 2012 011352 A1 | 9/2012 |
| EP | 2 932 879 A1 | 10/2015 |
| WO | 98/46113 | 10/1998 |

OTHER PUBLICATIONS

Italian Search Report dated Feb. 1, 2017, issued in Italian Application No. 102016000053336, filed May 24, 2016.

*Primary Examiner* — Benjamin L Osterhout
(74) *Attorney, Agent, or Firm* — Workman Nydegger (57) ABSTRACT

A washing machine, which is adapted for cages and accessories used in the field of research on laboratory animals, and which has a wash chamber and an assembly for introducing washing liquid and rinsing liquid into the wash chamber, includes: two loading levels in the wash chamber, each loading level having two shelves arranged in symmetrical positions relative to the median longitudinal axis of the wash chamber; supports for the shelves, the supports being located in symmetrical positions on both sidewalls of the wash chamber and allowing the shelves to be arranged at different tilting angles; three washing and rinsing assemblies oscillating and rotating about a respective longitudinal axis in the wash chamber, the three assemblies being fed by the assembly for introducing washing liquid and rinsing liquid, and being interposed between the loading levels and lying in a symmetrical vertical plane in the wash chamber; an assembly for causing the oscillation and rotation of the three washing and rinsing assemblies.

16 Claims, 11 Drawing Sheets

(51) Int. Cl.
*A01K 1/035* (2006.01)
*B08B 3/04* (2006.01)
*A01K 29/00* (2006.01)
*B05B 13/04* (2006.01)
*B05B 1/20* (2006.01)
*B08B 9/08* (2006.01)

(52) U.S. Cl.
CPC ............... *B08B 3/02* (2013.01); *B08B 3/024* (2013.01); *B08B 9/0861* (2013.01); *A01K 29/00* (2013.01); *B08B 3/04* (2013.01)

(56) References Cited

U.S. PATENT DOCUMENTS

| | | | | |
|---|---|---|---|---|
| 3,746,022 | A * | 7/1973 | Fillion | B08B 3/02 |
| | | | | 134/141 |
| 5,205,419 | A * | 4/1993 | Purtilo | A47L 15/503 |
| | | | | 134/200 |
| 5,402,809 | A | 4/1995 | Smith | |
| 6,571,812 | B1 * | 6/2003 | Lavoie | A61L 2/18 |
| | | | | 134/191 |
| 2005/0235518 | A1 * | 10/2005 | Binder | B08B 3/02 |
| | | | | 34/202 |
| 2011/0226285 | A1 * | 9/2011 | Savoia | B08B 3/02 |
| | | | | 134/21 |
| 2015/0239018 | A1 * | 8/2015 | Voyer | B08B 3/024 |
| | | | | 239/264 |

\* cited by examiner

FIG. 10

WASHING MACHINE ADAPTED FOR CAGES AND ACCESSORIES USED IN THE FIELD OF RESEARCH ON LABORATORY ANIMALS

CROSS-REFERENCE TO RELATED APPLICATIONS

This application claims priority to Italian Application No. 102016000053336, filed May 24, 2016, which is incorporated herewith.

DESCRIPTION

Field of the Invention

The present invention relates to a washing machine for cages and accessories used in the field of research on laboratory animals.

Background Art

In the field of research on laboratory animals, washing machines are commonly used, particularly for dirt removal and sanitization of plastic stabling cages, including accessories thereof such as: covers, troughs made from stainless steel wire, watering bottles, etc.

Many washing machines are currently available on the market for such applications, but they can essentially be divided into the following categories, which differ in:

Load capacity,
Continuous-flow or discontinuous-flow (batch) operation,
Washing system with oscillating rods or with rotary rods and translating rods.

The machine of the present invention belongs to the family of discontinuous-flow (batch) washing machines of small/medium size.

For small/medium-size stabling cages, batch-loading cage washers are used which are fitted with either a single or a double door, depending on whether or not a barrier needs to be used for dividing the loading area (dirty side) from the unloading area (clean side).

The machines may then be provided either with one loading shelf or with multiple stacked shelves for load optimization, resulting in higher productivity as a function of the machine'footprint. It is apparent that the hydraulic circuit of delivering water to all loading points is more complex in machines with multiple loading levels.

Multiple-level washing machines are commonly available on the market, wherein rotary-rod systems are preferred over the use of oscillating rods because of their simpler construction. However, this is detrimental in terms of washing effectiveness, which can be measured as the impact force exerted on the load by the liquid, optimal coverage of the surfaces involved, and rod rotation and speed certainty over time.

Since the machines must be able to wash different objects, as aforementioned, it is necessary to provide accessories for loading the various products on the shelves and for orienting them properly in order to optimize the exposition thereof to the jets of the washing nozzles and to maximize the load.

Another point that characterizes the various washing machines available on the market, and which is often attentively taken into consideration by customers before choosing a machine, is the volume of the wash tub, which translates into consumption of water, detergents and bath heating energy. The volume of the wash tub is determined by the number of nozzles installed on the washing rods and by the performance to be obtained in terms of washing quality.

In fact, given the desired performance level, a larger number of nozzles will require a centrifugal pump with a higher flow-rate, which in turn will require a higher liquid head on the suction opening, and consequently a greater water volume in the tub of the machine. All this will then translate into greater volumes of detergents and higher energy consumption for heating.

The doors allowing access to the load deposited on the shelves inside the wash chamber may be horizontally-pivoted leaf-type units or vertically sliding units. Access to the load is obtained, if required because of the depth of the machine, by means of horizontally sliding shelves, thus facilitating the operator's work.

The following particular kinds of problems can be identified as far as small/medium-size washing machines are concerned:

Running costs: the consumptions of water, energy and chemical products for one wash cycle, translated into production costs per stabling cage, are attentively evaluated by the users before purchasing the machine. It is apparent that lower running costs per washed unit will ensure greater commercial competitiveness.

Machine production costs: these costs are generated, in particular, by the building solutions employed for the washing systems known in the art. A simpler washing system providing the same load capacity and wash results will lead to lower machine production costs, resulting in lower purchase prices.

Load capacity in terms of number of stabling cages that can be loaded on the shelf(ves): increasing the load capacity without increasing the machine's footprint, while at the same time simplifying the washing system without affecting performance and consumptions, provides an additional competitive advantage.

Necessity of providing accessories for loading different objects on the shelves: flexibility is another feature demanded by the market. In order to ensure exposition to the jets of the washing nozzles and optimal coverage, accessories must be provided which are often bulky and certainly not ideal for small wash areas.

SUMMARY OF THE INVENTION

The present invention provides for a washing machine for cages and accessories used in the field of research on laboratory animals.

It is one object of the present invention to provide a washing machine ensuring lower running costs, lower machine production costs, higher load capacity with the same footprint, and more flexibility in terms of different objects to be washed.

The present invention relates to a washing machine adapted for cages and accessories used in the field of research on laboratory animals, comprising a wash chamber and an assembly for introducing washing liquid and rinsing liquid into said wash chamber, characterized in that it comprises:

two loading levels in said wash chamber, each loading level comprising two shelves arranged in symmetrical positions relative to the median longitudinal axis of said wash chamber;

supports for said shelves, said supports being located in symmetrical positions on both sidewalls of said wash chamber and allowing said shelves to be arranged at different tilting angles;

three washing and rinsing assemblies oscillating and rotating about a respective longitudinal axis in said wash chamber, said three assemblies being fed by said means for introducing washing liquid and rinsing liquid, and being interposed between said loading levels and lying in a symmetrical vertical plane in said wash chamber;

an assembly for causing said oscillation and rotation of said three washing and rinsing assemblies.

It is a particular object of the present invention to provide a washing machine for cages and accessories used in the field of research on laboratory animals as set out in detail in the claims, which are an integral part of the present description.

BRIEF DESCRIPTION OF THE DRAWINGS

Further objects and advantages of the present invention will become apparent from the following detailed description of a preferred embodiment (and variants) thereof referring to the annexed drawings, which are given by way of non-limiting example, wherein:

FIGS. 3.1, 3.2, 3.3 show three different tilted positions of the shelves on the respective supports in the wash chamber;

FIGS. 5.1, 5.2 highlight a few details of some elements for supporting the shelves and for driving the washing and rinsing assemblies;

FIGS. 9.1, 9.2, 10 show some possible solutions for positioning angular members made from sheet metal on the shelves in order to be able to properly position bottle racks, in a partial view (FIGS. 9.1, 9.2) and in a full view (FIG. 10), respectively.

In the drawings, the same reference numerals and letters identify the same items or components.

DETAILED DESCRIPTION OF SOME EMBODIMENTS OF THE INVENTION

The washing machine of the invention will now be described with reference to a non-limiting embodiment as illustrated in the drawings.

The washing machine is of the type equipped with an upward-sliding simple or double door, completely made of glass for better internal visibility during the wash process.

Figure 1:
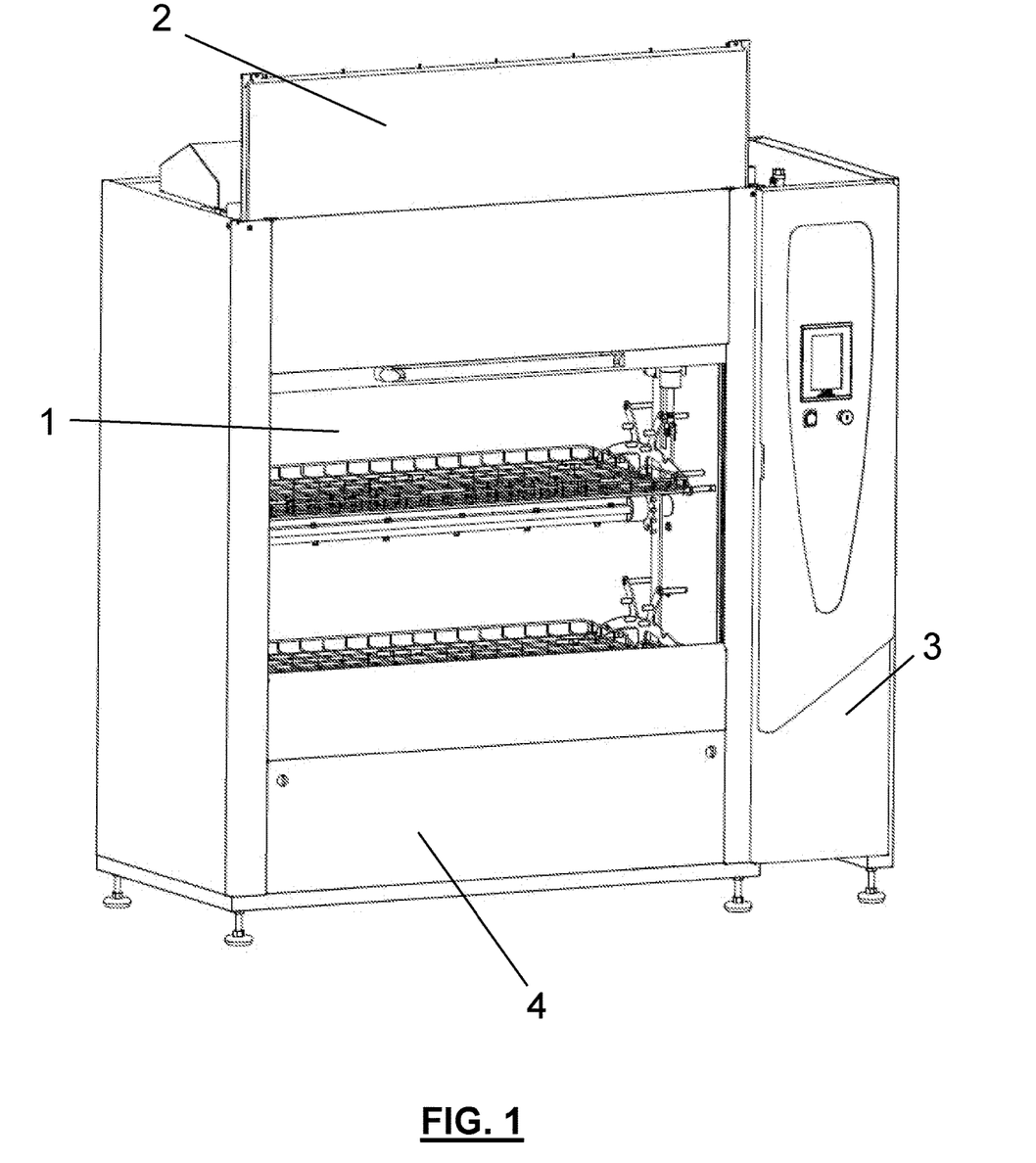
FIGS. 1 and 2 show an example of a washing machine according to the present invention in a perspective front view and in a front view, respectively.
Figure 2:
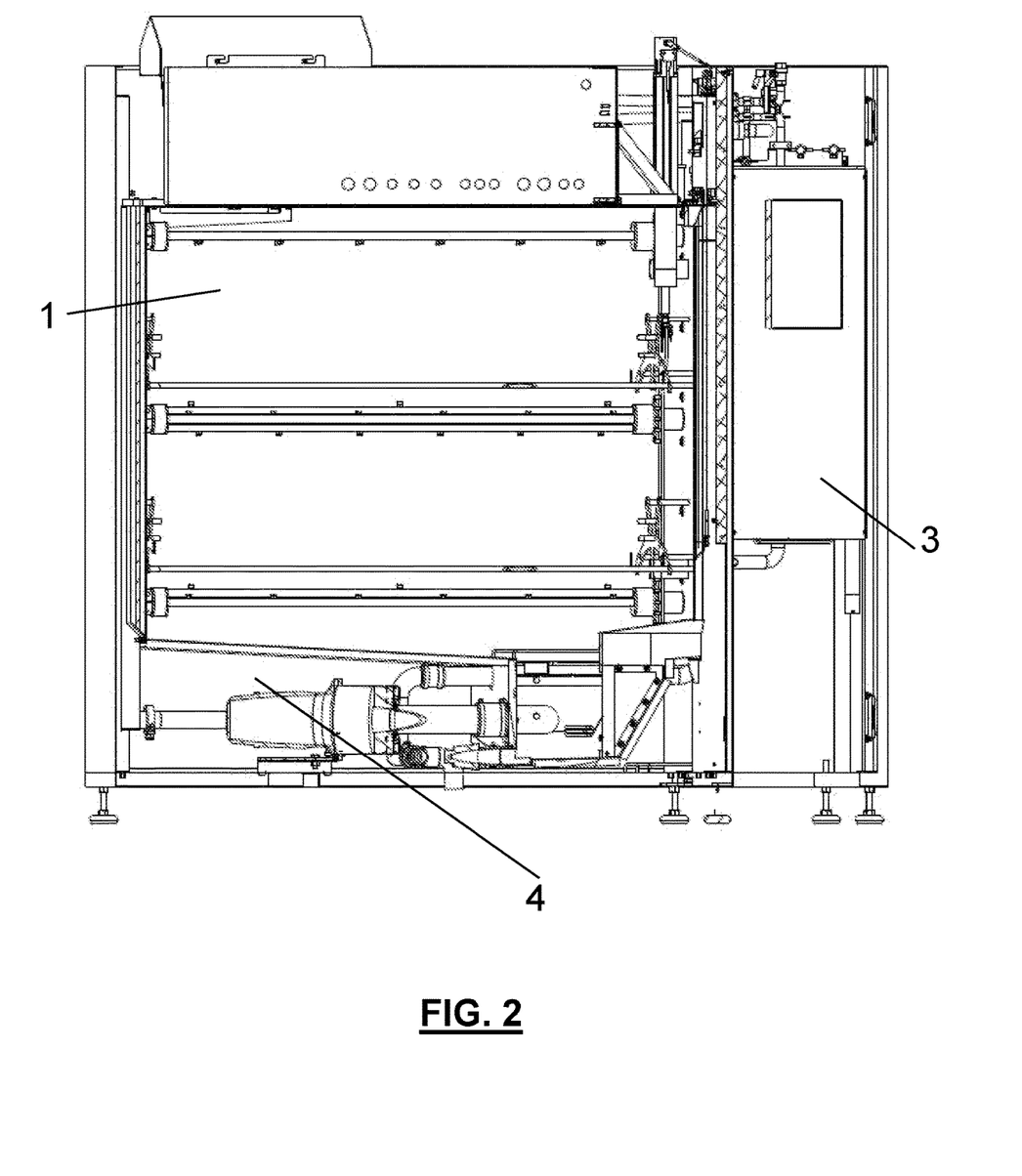

In FIGS. 1 and 2 the whole machine is shown, which comprises a wash chamber 1, a vertically sliding access door 2 made of transparent material, e.g. glass or plastic. There are also a lateral compartment 3 and a lower compartment 4 for containing the hardware and software control and monitoring elements of the machine.

Figure 31:
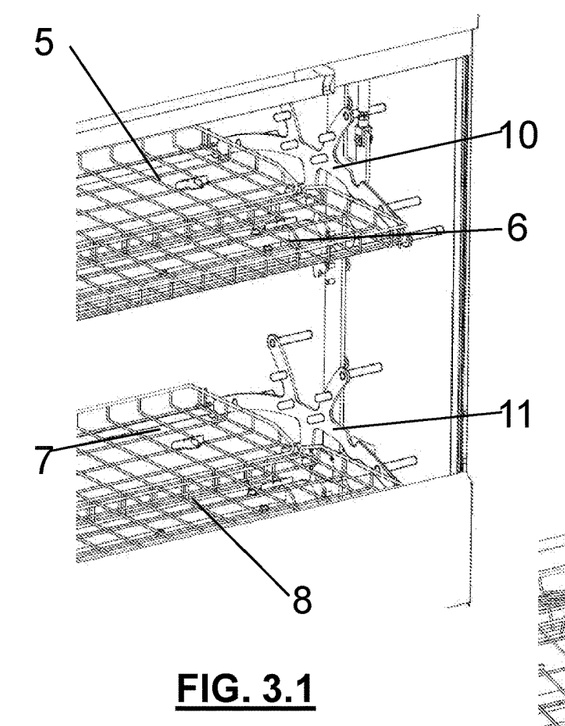
Figure 32:
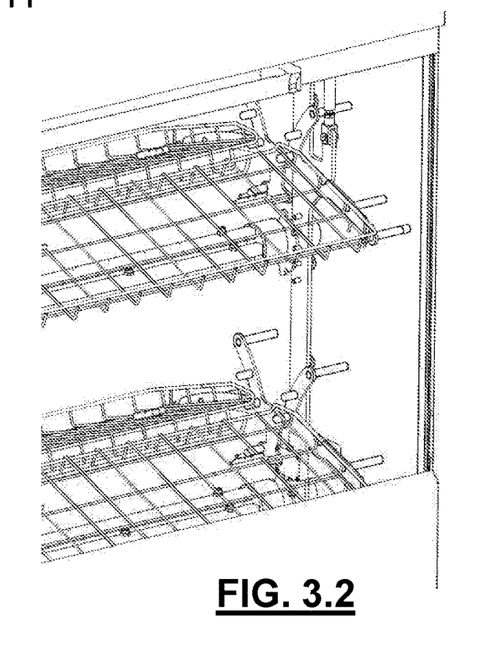
Figure 33:
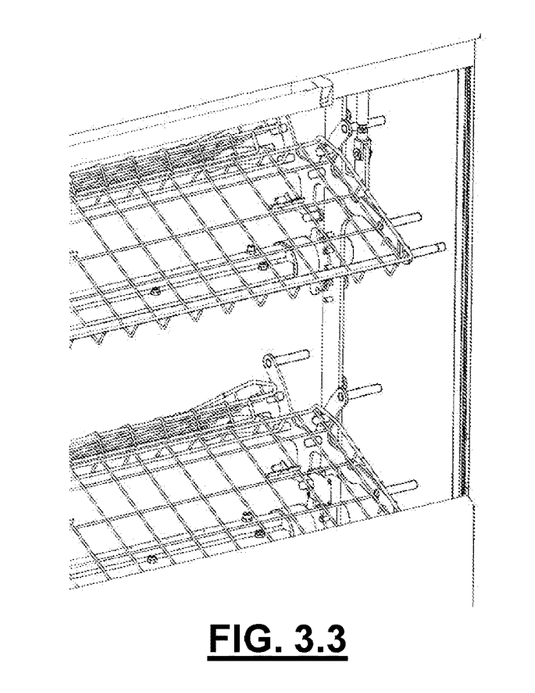

The wash chamber of the machine is provided with two loading levels, each one made up of two shelves 5-8 (FIG. 3).

The two shelves are arranged in symmetrical positions relative to the median longitudinal axis of the wash chamber (parallel to the front opening), for each loading level, thus facilitating the loading and unloading operations, especially in the case of a double access door on the two opposite sidewalls.

The shelves are made out of stainless steel wire and are very light and easy to remove or shift, and hence ergonomical. No tool is needed for removal or shifting.

Symmetrical supports are secured to both sidewalls of the wash chamber 1, which allow the shelves to be positioned at different tilting angles, so that the stabling cages can be loaded at different tilting angles depending on their geometry. In FIGS. 3.1-3-3, 5.1 the supports 10, 11 of one sidewall are visible, and FIG. 9.1 highlights one of them (12).

Figure 52:
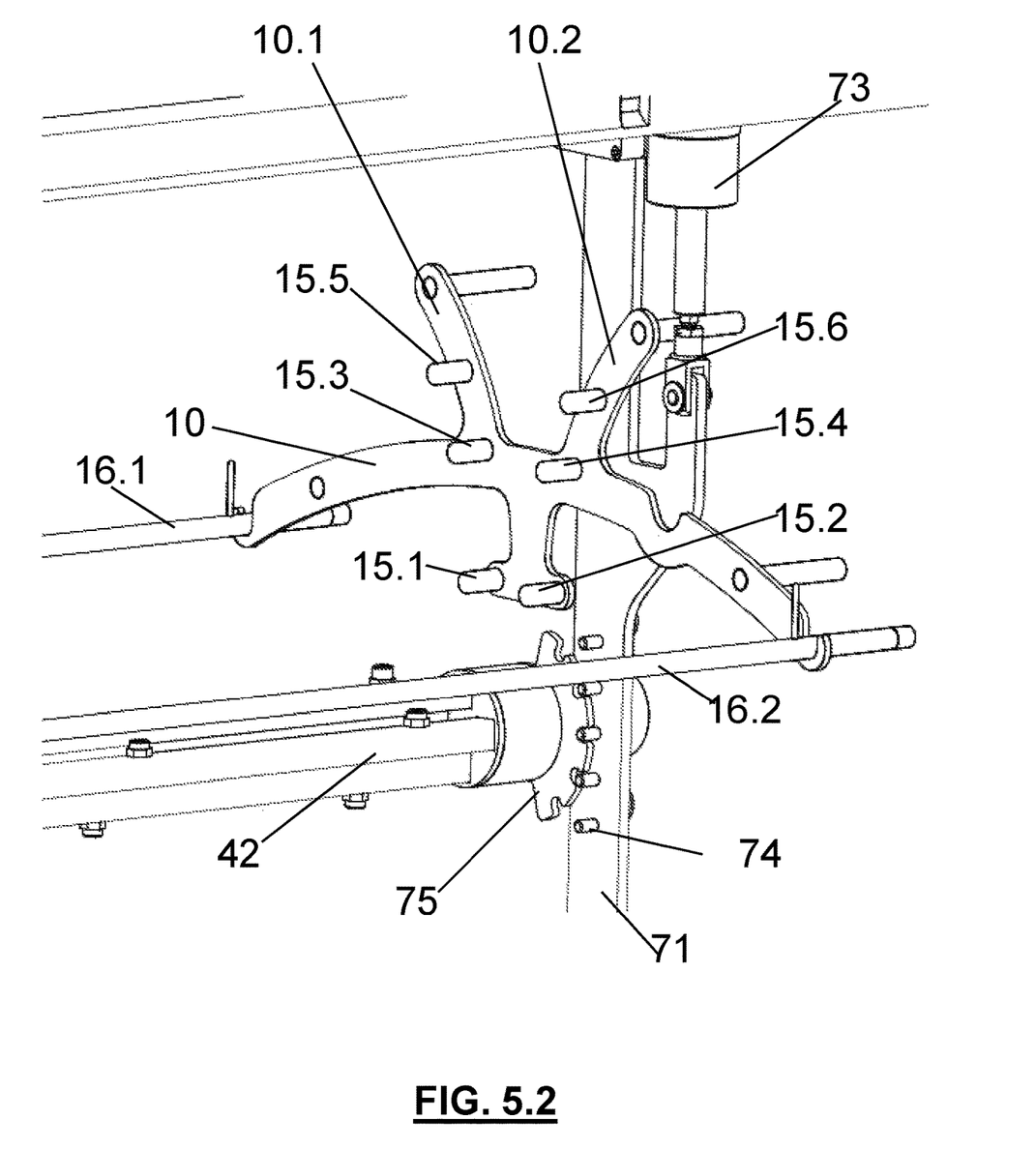

Pairs of pins are present on the supports, with which the corners of the shelves engage in an internal position in the chamber to provide the various tilting angles. Said pins are installed on vertical extensions (10.1, 10.2, 11.1, 11.2) at different heights in the inner parts of the supports. With particular reference to FIG. 5.2, one can see the pairs of pins 15.1 . . . 15.6 of the support 10.

Instead, those parts of the shelves which are located in an external position relative to the chamber rest on rods engaged with the outer ends of the supports. FIG. 5.2 shows the rods 16.1, 16.2 engaged with the support 10.

This ensures optimal exposition of the cages to the jets of the sprayer nozzles, which In the variant described herein, the supports are designed for obtaining three basic tilting positions of the shelves:

Position 1 (FIG. 3.1): tilting angle of 0°. A single, perfectly horizontal shelf is obtained, which also allows loading quite big cages (according to the available loading surface).

Position 2 (FIG. 3.2): intermediate tilting angle of 19°, especially suitable for small cages.

Position 3 (FIG. 3.3): maximum tilting angle of 31°, especially suitable for medium-size cages.

A coverage study conducted on cages subjected to the jets of the sprayer nozzles showed that three shelf positions are sufficient to allow loading cages of the most common types, the dimensions of which have been standardized at European and international level. See the example shown in FIG. 2, referring to two cages loaded on respective shelves with the opening facing downwards.

It is however possible to employ a different number of pins to obtain different shelf tilting angles and optimal cage positioning for proper exposition to the sprayer nozzles.

With this solution, a machine can be realized which, in comparison with a machine offering only horizontal cage loading without any special accessory, has a greater capacity by 20%.

In addition, the chamber is less deep, thus facilitating cage loading and unloading by the operator, in both the single and double door versions, without it being necessary to slide the shelves outwards.

This facilitated procedure is possible also because of the use of the upward-sliding door, which offers the advantage of not hindering the operator when it is open.

Figure 10:
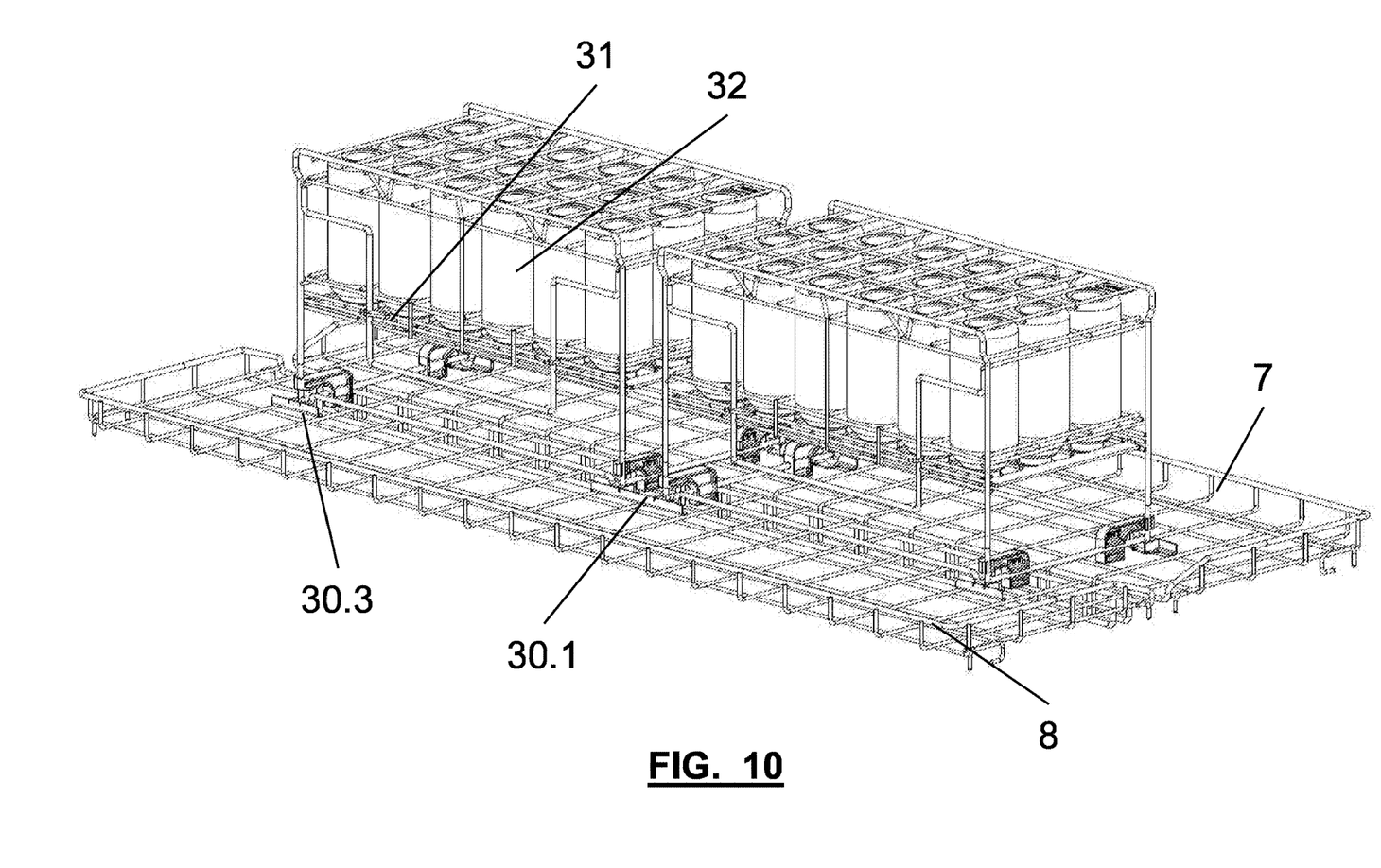
Figure 91:
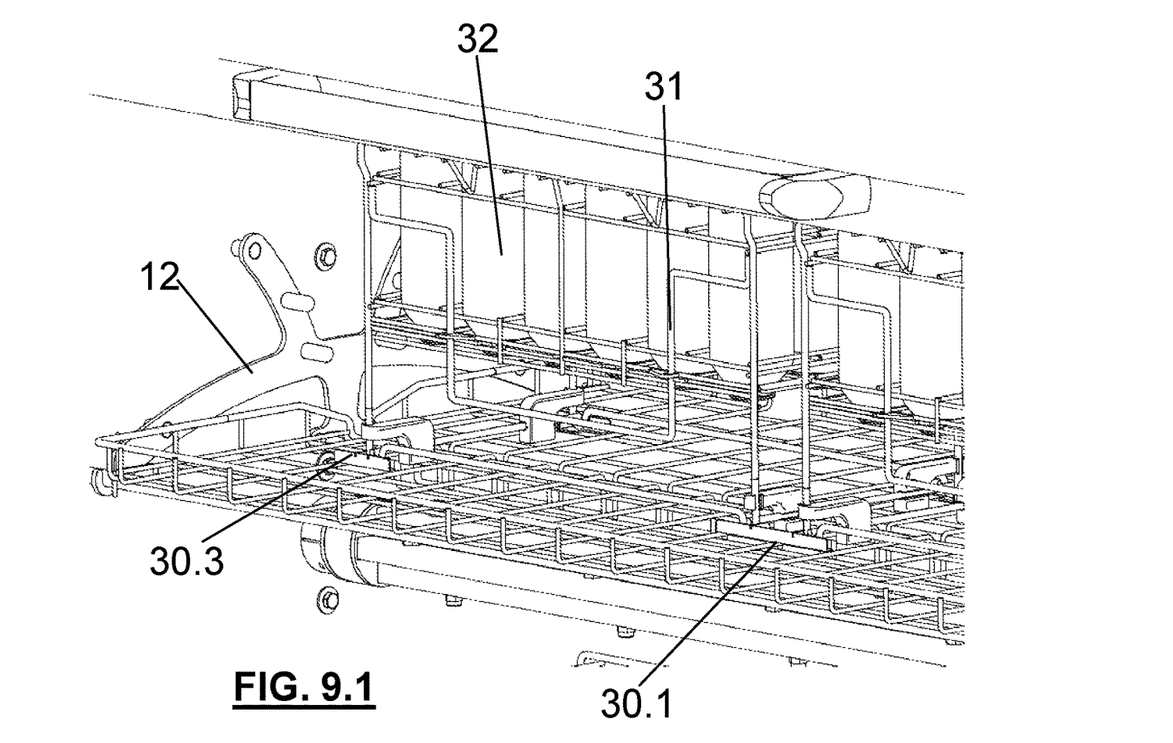
Figure 92:
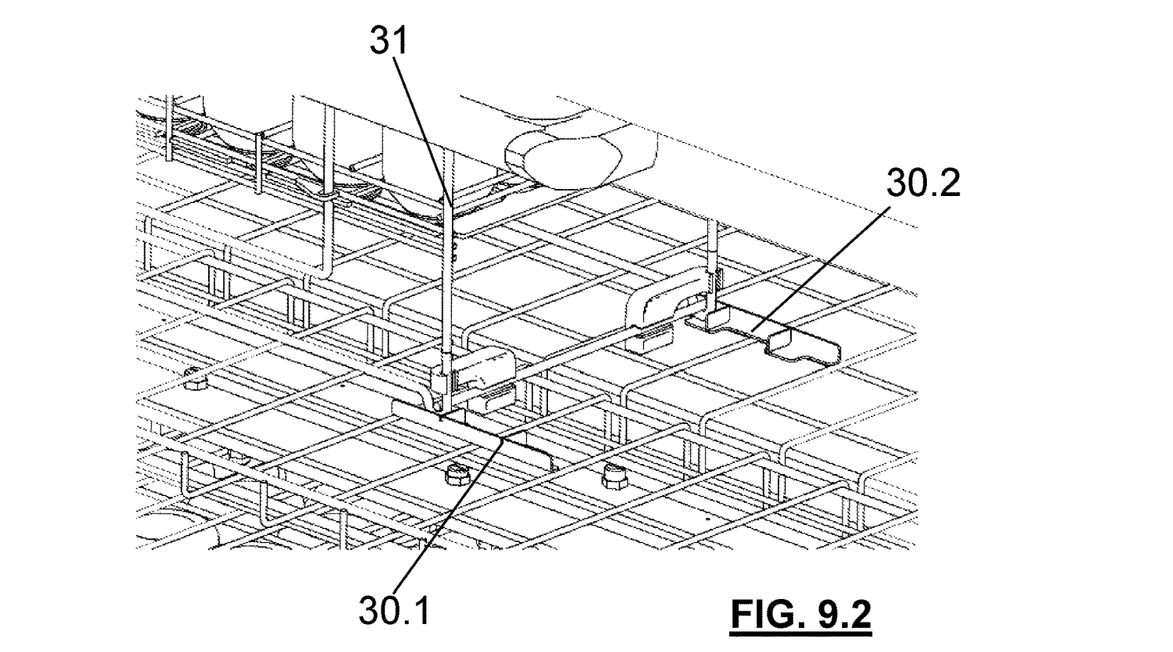

With reference to FIGS. 9.1, 9.2, 10, angular members made from sheet metal are welded in suitable positions on the shelves (the visible ones are designated as 30.1, 30.2, 30.3), which serve as references for loading bottle racks (a rack 31 with bottles 32 inserted therein is shown).

It is important that the racks are centred in the correct positions, so as to make sure that the jets of the sprayer nozzles will enter through the bottle openings, the bottles being arranged upside-down, with their openings facing downwards.

Figure 4:
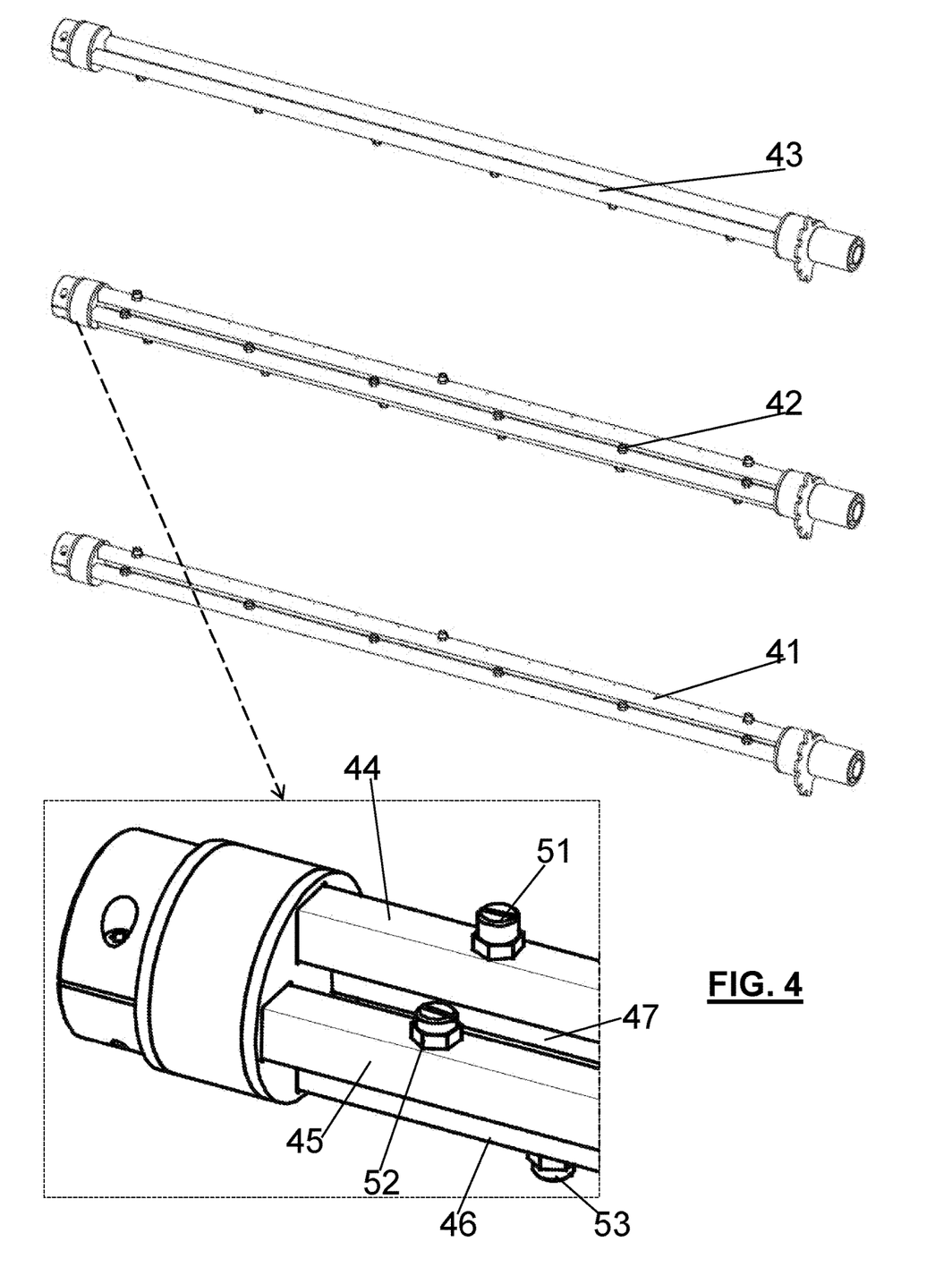
FIG. 4 shows the three oscillating and rotating washing and rinsing assemblies in the wash chamber; a magnified view of a terminal part of one assembly is also shown.
Figure 6:
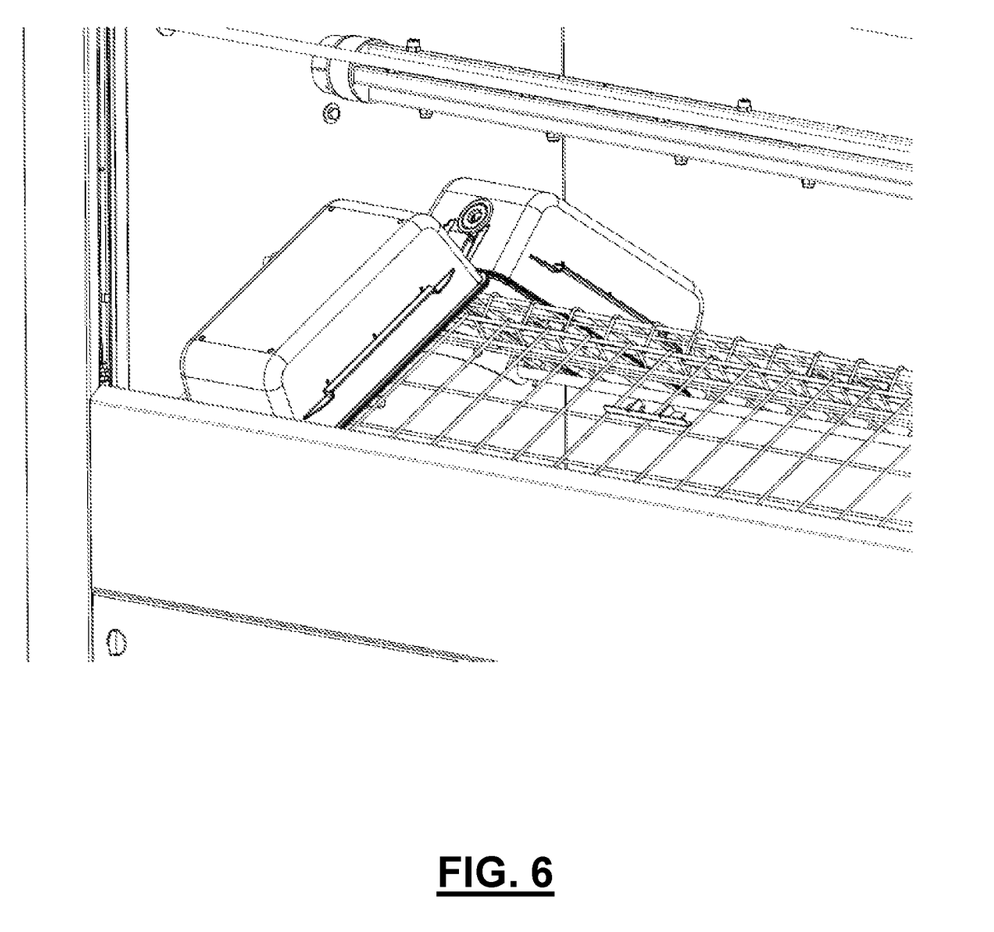
FIG. 6 shows an example of arrangement of cages on the shelves of the machine.

The machine is provided with three washing and rinsing assemblies oscillating and rotating about their longitudinal axis (see in particular FIG. 4, as well as FIGS. 7, 8), the washing and rinsing assemblies interposed between the loading levels. Their terminations pass through holes in the sidewalls of the wash chamber (see FIGS. 5.2, 6) and are connected to the delivery manifolds for the washing and rinsing liquids shown in FIG. 8. In particular:

The lower assembly 41 is arranged under the lower loading level.

The intermediate assembly 42 is arranged in an intermediate position between the lower and upper loading levels.

The upper assembly 43 is arranged above the upper loading assembly.

Each assembly comprises longitudinal, parallel, independent but mutually integral washing and rinsing rods, which are hydraulically separate to avoid any mixing and contamination between the washing bath (containing detergent and recirculated) and the rinsing bath.

The rods are in the form of tubes having a square cross-section (see magnified detail in FIG. 4), whereon sprayer nozzles are mounted. Thus, mounting the sprayer nozzles is easy because they screw directly into threaded holes formed on a flat surface of the tube, so that, unlike when using round tubes, welding commercial threaded sleeves is not required. See magnification in FIG. 4, which highlights a detail of one end of the central assembly 42, with the terminals of the rods 44-47 and the sprayer nozzles 51-53.

Figure 51:
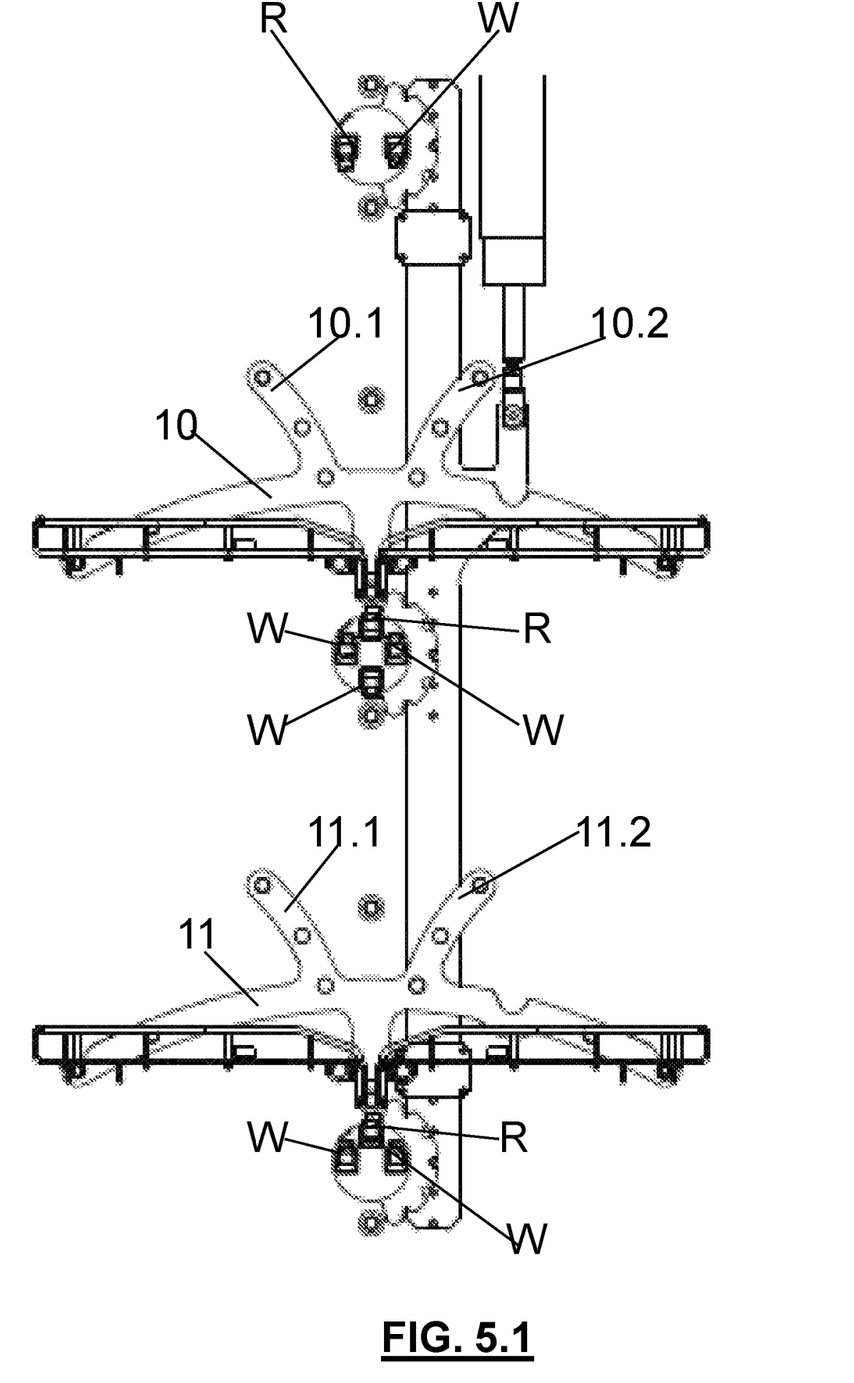

One particular composition of the three assemblies is as follows, with reference to FIG. 5.1, which schematically shows the relative arrangement thereof (letter W indicates the positions of the washing rods; letter R indicates the positions of the rinsing rods):

1) Lower assembly: two washing rods W and one rinsing rod R;
2) Intermediate assembly: three washing rods W and one rinsing rod R;
3) Upper assembly: one washing rod W and one rinsing rod R.

As the assemblies, and hence the rods, rotate, the jets of the sprayer nozzles completely cover the flat surfaces of both cage loading levels, thereby ensuring proper coverage of the load that needs to be washed.

Figure 8:
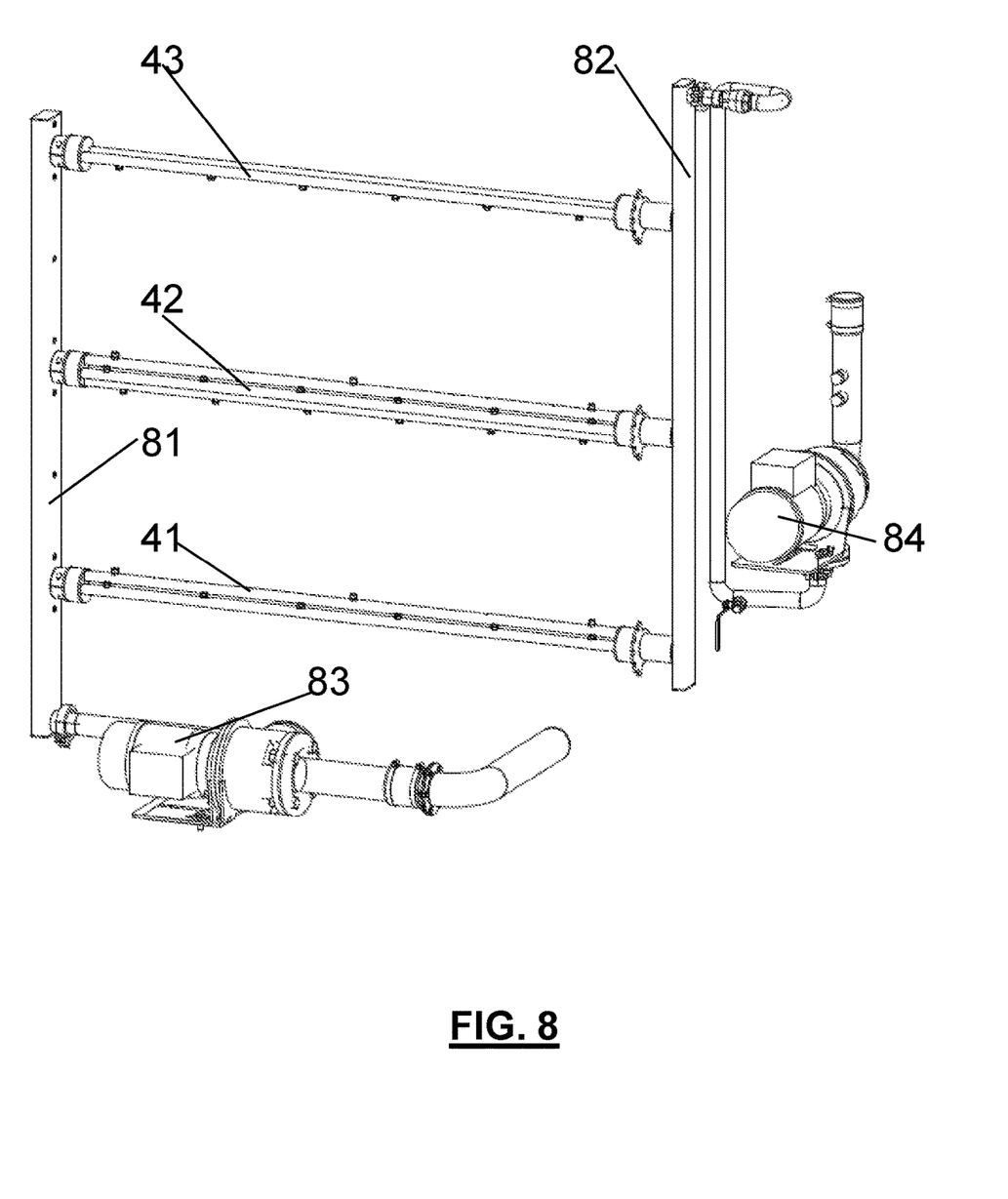
FIG. 8 shows the system for supplying the washing and rinsing liquids.

The three assemblies are fed by separate washing and rinsing water circuits (see FIG. 8).

This is achieved by means of two manifolds having a rectangular cross-section, arranged externally and adjacent to the opposite sidewalls of the wash chamber. More in detail, the wash manifold 81 is located on one side, e.g. the left-hand side (viewing the machine at the front), while the rinse manifold 82 is located on the opposite side, e.g. the right-hand side.

The wash manifold 81 is directly connected to the delivery side of the centrifugal main pump 83 of the machine, which takes in the liquid from a tank containing the washing bath.

The rinse manifold 82 is directly connected to the delivery side of the centrifugal rinse pump 84, which takes in the water from a storage tank for rinsing water.

The washing rods of each assembly are all, therefore, fed on one side only by the wash manifold arranged on the left-hand side, and are plugged on the other side. On the contrary, the rinsing rods are all fed by the rinse manifold arranged on the right-hand side, and are plugged on the other side.

The bottom side of the wash chamber is so shaped as to collect the dirty liquids during both the wash phase and the rinse phase, which liquids are then collected into suitable tanks (not shown in the drawings).

Machines are known which are provided with oscillating washing rods arranged with their axis orthogonal to the front side of the machine.

In order to ensure load coverage with this known configuration, it is however necessary to employ a number of rods that may even be more than twice the number of rods used in the machine according to the present invention.

The novel solution implies, therefore, lower production costs and also, most importantly, requires a much lower bath flow-rate for the bath to exert the same impact force on the surfaces to be washed.

The centrifugal pump can thus be downsized, so that the electric power of its motor and the cost of the motor-pump assembly are reduced as well. A smaller centrifugal motor pump is easier to position in the compartment under the wash chamber, so that the outer dimensions of the machine can be reduced.

Further advantages are also apparent, which derive from the smaller number of washing rods and the resulting lower bath flow-rate. A smaller centrifugal pump can work with a smaller total volume of water. This is due to a characteristic number of the pump (referred to as NPSH), which determines the minimum value of the bath level at the pump intake.

Pumps having less power have lower NPSH values, and therefore require lower bath levels in the tub.

Because of the lower flow-rate of the centrifugal pump, the bath volume necessary in the wash tub to ensure proper pump operation with no cavitation problems is further reduced.

In substance, the two conditions of reduced bath volume and reduced bath level in the tub allow attaining a considerable reduction in water consumption, which translates into saved energy and detergents, as well as less environmental impact (caused by polluting bath drainage), etc. Furthermore, compared to a large-volume tub, better bath renewal is obtained at every rinse cycle.

The rinsing water, in fact, after having been sprayed onto the load by the rinsing rods, falls again into the underlying tub that collects the washing bath, which, being continuously recirculated cycle after cycle, becomes increasingly filled with dirt and impurities. Mixing the rinsing water into the washing bath contributes to keeping the pollutant concentration low. It is therefore apparent that the smaller the volume of the washing bath, the better the renewal and the lower the concentration of dirt, resulting in a qualitatively better process.

The three oscillating assemblies are advantageously positioned in a symmetrical vertical plane within the wash chamber.

Figure 7:
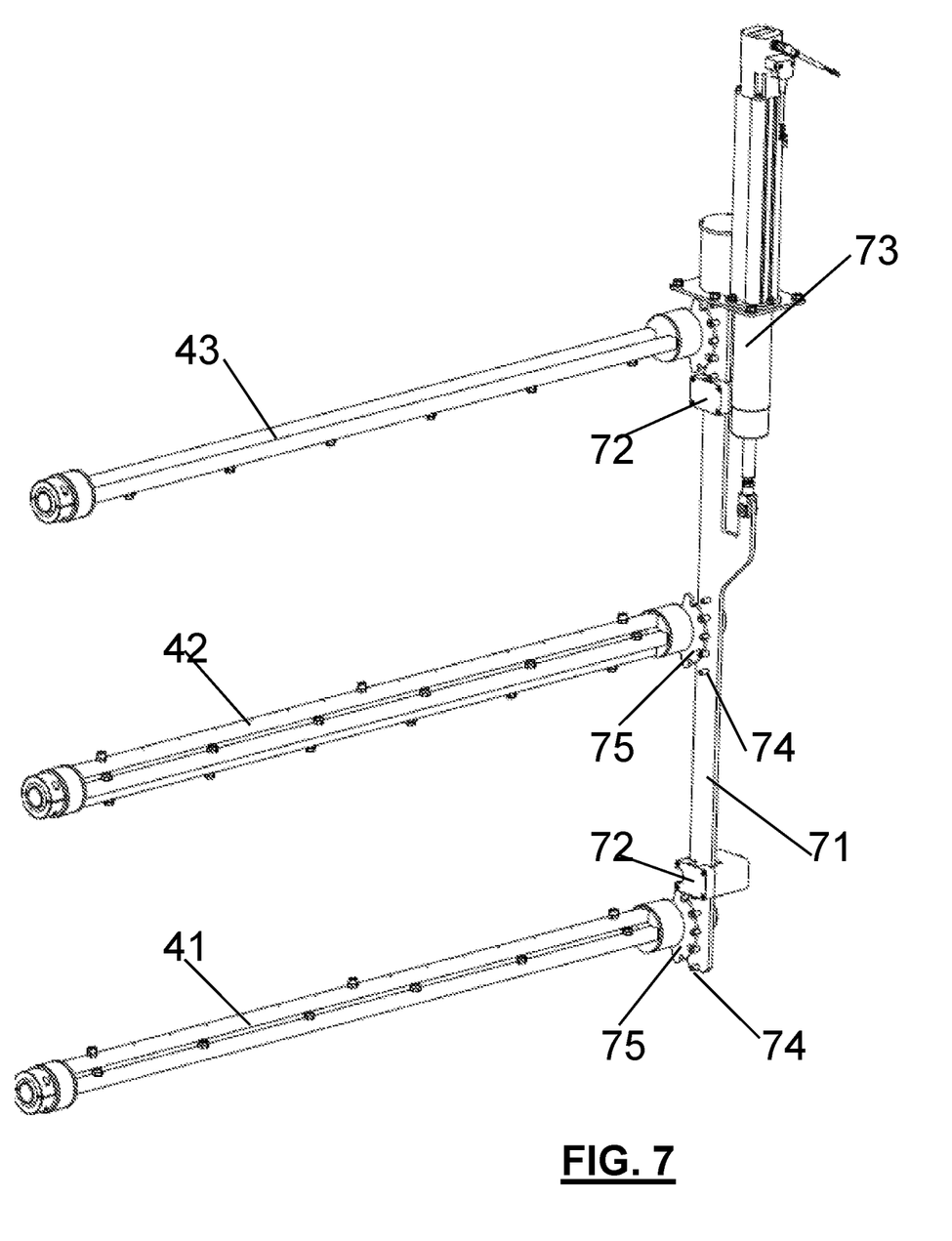
FIG. 7 shows the system for driving the three washing and rinsing assemblies.

In this manner, oscillation of the three assemblies, and hence of the rods, can be easily obtained by means of a rack and pinion system (see FIGS. 5.2, 7).

A control rod 71 slides vertically along an inner sidewall of the wash chamber within suitable anti-wear guides 72. The rod receives a reciprocating motion from a cylinder 73 vertically secured to the ceiling, outside the wash chamber, which cylinder may be electrically or pneumatically controlled.

A number of pins 74 are secured at a constant pitch on the control rod, which engage with a circular sector 75 integral with each oscillating assembly.

The circular sectors 75 are provided with a number of slots adapted to receive the pins, thus transforming the linear motion of the control rod into oscillating rotary motion.

The above-described non-limiting example of embodiment may be subject to variations without departing from the protection scope of the present invention, including all equivalent designs known to a man skilled in the art.

The elements and features shown in the various preferred embodiments may be combined together without however departing from the protection scope of the present invention.

From the above description, those skilled in the art will be able to produce the object of the invention without introducing any further construction details.

The invention claimed is:

1. A washing machine adapted for cages and accessories used in the field of research on laboratory animals, comprising a wash chamber and an assembly for introducing washing liquid and rinsing liquid into said wash chamber, the washing machine comprising:
    two loading levels in said wash chamber, each loading level comprising two shelves arranged in symmetrical positions relative to a median longitudinal axis of said wash chamber;
    supports for said shelves, said supports being located in symmetrical positions on opposing sidewalls of said wash chamber and allowing said shelves to be arranged at different tilting angles;
    three washing and rinsing assemblies adapted to make movements of oscillation and rotation about a respective longitudinal axis in said wash chamber, said three washing and rinsing assemblies being adapted to receive said washing liquid and said rinsing liquid from said assembly for introducing washing liquid and rinsing liquid, and said three washing and rinsing assemblies being interposed between said loading levels and longitudinally extending in parallel alignment with said loading levels so that a vertical plane in said wash chamber passes through each of the three washing and rinsing assemblies and through the two loading levels;
    an assembly for causing said oscillation and rotation of said three washing and rinsing assemblies.

2. The washing machine according to claim 1, wherein said supports for said shelves comprise:
    pairs of pins adapted for engagement with the corners of said shelves in an internal position in the wash chamber, said pins being installed on vertical extensions at different heights in the inner parts of said supports, thus allowing the shelves to be arranged at said different tilting angles;
    rods engaged with the outer ends of said supports, the outermost parts of the shelves in the wash chamber resting on said rods.

3. The washing machine according to claim 2, wherein said pairs of pins are three, so as to obtain three different tilting angles of said shelves, a horizontal tilting angle, an intermediate tilting angle, and a maximum tilting angle.

4. The washing machine according to claim 1, wherein each one of said three washing and rinsing assemblies comprises:
    terminations passing through holes in sidewalls of the wash chamber, and connected to said assembly for introducing washing liquid and rinsing liquid into said wash chamber;
    longitudinal, parallel, independent, mutually integral and hydraulically separate washing and rinsing rods, connected to said terminations;
    sprayer nozzles secured to said rods.

5. The washing machine according to claim 4, wherein said rods are shaped like tubes having a square cross-section.

6. The washing machine according to claim 4, wherein said three washing and rinsing assemblies comprise:
    a lower assembly comprising two washing rods and one rinsing rod;
    an intermediate assembly comprising three washing rods and one rinsing rod;
    an upper assembly comprising one washing rod and one rinsing rod.

7. The washing machine according to claim 1, wherein said assembly for introducing washing liquid and rinsing liquid into said wash chamber comprises a first and a second pump, two manifolds arranged externally and adjacent to the opposite sidewalls of said wash chamber, said two manifolds comprising a wash manifold connected to said first pump and a rinse manifold connected to said second pump.

8. The washing machine according to claim 1, wherein said assembly for causing said oscillation and rotation of said three washing and rinsing assemblies comprises:
    a control rod adapted to slide vertically in an alternate fashion on an inner sidewall of said wash chamber;
    a cylinder for actuating said rod;
    wherein a number of pins are secured at a constant pitch on the control rod, which are adapted to engage with circular sectors integral with each washing and rinsing assembly.

9. The washing machine according to claim 1, comprising, on said shelves, a number of angular members adapted for use as references for loading bottle racks.

10. The washing machine according to claim 1, comprising an access door allowing access to said wash chamber, said access door being vertically slidable and being made of transparent material.

11. The washing machine according to claim 1, wherein said assembly for introducing washing liquid and rinsing liquid into said wash chamber and said three washing and rinsing assemblies are configured to keep the washing water and rinsing water separated from each other.

12. The washing machine according to claim 1, wherein each of said three washing and rinsing assemblies includes a tubular rinsing rod having spray nozzles disposed thereon and a tubular washing rod having spray nozzles disposed therein, each of said tubular rinsing rods being isolated from said tubular washing rods so that there is no fluid communication between said tubular rinsing rods and said tubular washing rods.

13. The washing machine according to claim 12, wherein each of said tubular rinsing rods is fluid coupled to said assembly for introducing washing liquid and rinsing liquid so as to receive said rinsing liquid but not said washing liquid.

14. The washing machine according to claim 13, wherein each of said tubular washing rods is fluid coupled to said assembly for introducing washing liquid and rinsing liquid so as to receive said washing liquid but not said rinsing liquid.

15. A washing machine adapted for cages and accessories used in the field of research on laboratory animals, comprising:
    two opposing sidewalls bounding a washing chamber therebetween;
    two loading levels horizontally disposed within said washing chamber and being vertically spaced apart, each loading level comprising two horizontally disposed shelves;

supports disposed on said sidewalls and supporting said shelves, said supports allowing said shelves to be arranged at different tilting angles;

three washing and rinsing assemblies rotatably disposed within the washing chamber so as to horizontally extend between the opposing sidewalls, said three washing and rinsing assemblies being vertically spaced apart so as to be separated by said two loading levels, each of said three washing and rinsing assemblies comprising a tubular rinsing rod having spray nozzles disposed thereon and a tubular washing rod having spray nozzles disposed therein, each of said tubular rinsing rods being isolated from said tubular washing rods so that there is no fluid communication between said tubular rinsing rods and said tubular washing rods.

16. The washing machine according to claim 15, wherein the three washing and rinsing assemblies and the two loading levels are disposed in parallel alignment so that a vertical plane in said wash chamber passes through each of the three washing and rinsing assemblies through the two loading levels.

* * * * *